United States Patent
Liew et al.

(10) Patent No.: US 8,717,694 B1
(45) Date of Patent: May 6, 2014

(54) IDENTIFYING DEFECTIVE SLOTS IN A DISK DRIVE TESTER

(75) Inventors: Hon Kong Liew, Bukit Rimau (MY); Rokhaizam Bin Mohd Ali, Shah Alam (MY); Minh N. Trinh, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 175 days.

(21) Appl. No.: 13/330,461

(22) Filed: Dec. 19, 2011

(51) Int. Cl.
- *G11B 27/36* (2006.01)
- *G01F 17/00* (2006.01)
- *G01F 23/00* (2006.01)
- *G01L 7/00* (2006.01)
- *G01N 11/00* (2006.01)

(52) U.S. Cl.
USPC .............................................. 360/31; 702/56

(58) Field of Classification Search
None
See application file for complete search history.

(56) References Cited

U.S. PATENT DOCUMENTS

| | | |
|---|---|---|
| 7,076,391 B1 | 7/2006 | Pakzad et al. |
| 7,483,269 B1 | 1/2009 | Marvin, Jr. et al. |
| 7,911,778 B2 | 3/2011 | Merrow |
| 7,945,424 B2 | 5/2011 | Garcia et al. |
| 8,041,449 B2 | 10/2011 | Noble et al. |
| 2003/0220751 A1* | 11/2003 | Toh et al. ......................... 702/56 |
| 2007/0253157 A1 | 11/2007 | Atkins et al. |
| 2009/0153992 A1 | 6/2009 | Garcia et al. |
| 2009/0153994 A1 | 6/2009 | Merrow et al. |
| 2009/0261229 A1 | 10/2009 | Merrow |
| 2009/0265136 A1 | 10/2009 | Garcia et al. |
| 2010/0083732 A1 | 4/2010 | Merrow et al. |
| 2010/0193661 A1 | 8/2010 | Merrow |

* cited by examiner

*Primary Examiner* — Regina N Holder

(57) ABSTRACT

A disk drive tester is disclosed operable to test a plurality of disk drives, each disk drive comprising a head actuated over a disk. The disk drive tester comprises a plurality of test slots, where each test slot is operable to receive one of the disk drives. The disk drive tester further comprises an interface for receiving vibration data from the disk drives, wherein the vibration data at least partially represents a vibration applied to each disk drive by the respective test slot. The disk drive tester further comprises control circuitry operable to detect when one of the test slots is defective in response to the vibration data.

16 Claims, 5 Drawing Sheets

IDENTIFYING DEFECTIVE SLOTS IN A DISK DRIVE TESTER

BACKGROUND

Disk drives are employed in numerous applications such as computer systems (e.g., desktops, laptops, portables, etc.) and consumer devices (e.g., music players, cell phones, cameras, etc.). A disk drive manufacturer will typically perform a number of production line tests to detect problems prior to shipping. For example, a defect scan may be preformed on each disk drive in order to detect and map out defective sectors or tracks, or various components may be tested, such as testing the heads to determine whether they should be depopulated or replaced. The disk drive may also maintain a number of logs, such as a manufacture log that stores manufacturing data of the disk drive, or a Self-Monitoring, Analysis, and Reporting Technology (S.M.A.R.T.) log that stores diagnostic information used for failure prediction while deployed in the field.

DETAILED DESCRIPTION OF EMBODIMENTS OF THE INVENTION

Figure 1A:
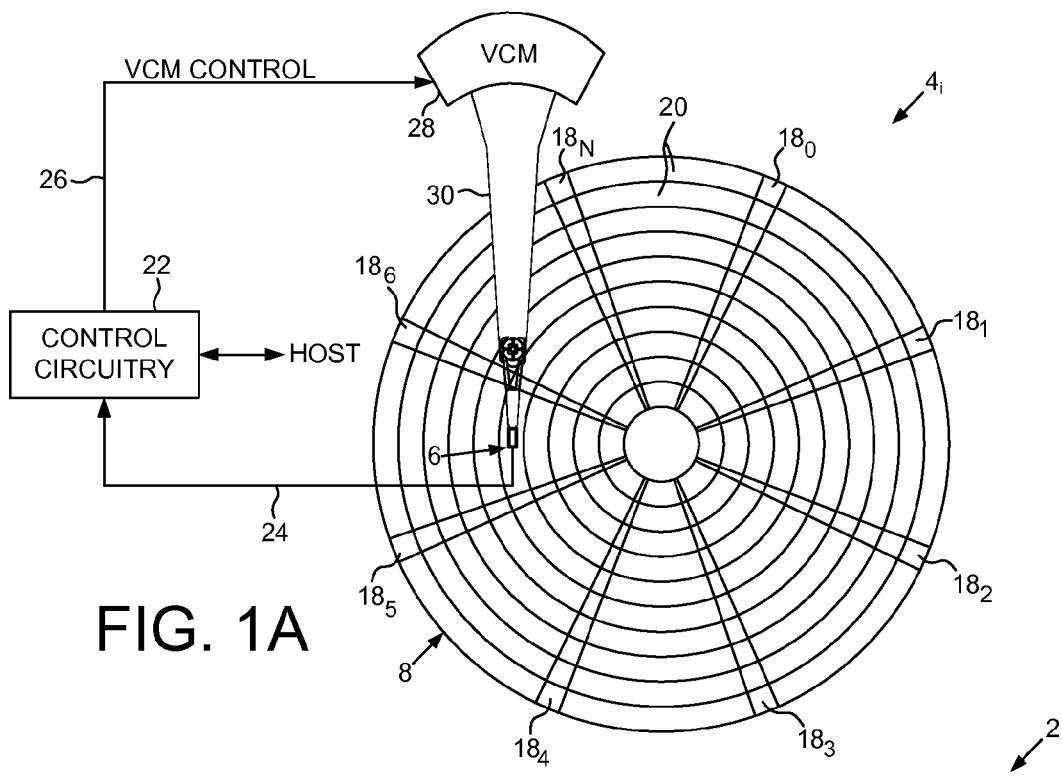
FIG. 1A shows a disk drive comprising a head actuated over a disk according to an embodiment of the present invention.
Figure 1B:
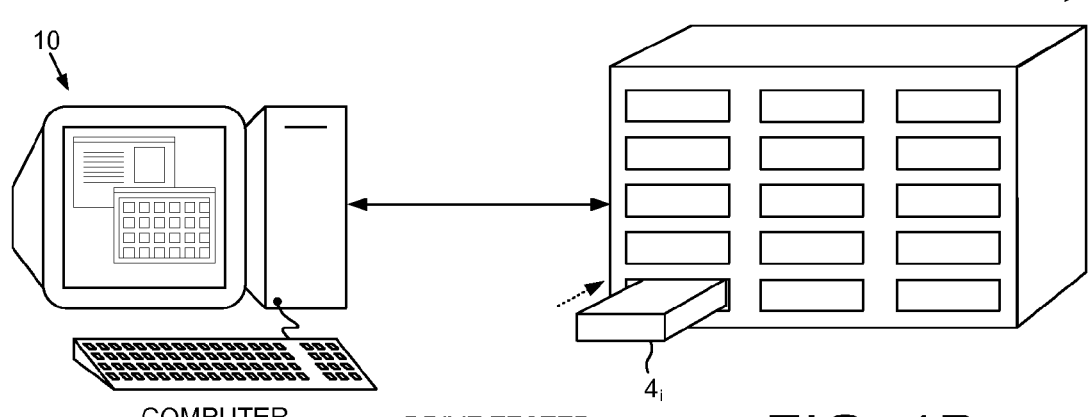
FIG. 1B shows a disk drive tester comprising a plurality of test slots according to an embodiment of the present invention.

FIG. 1B shows a disk drive tester 2 according to an embodiment of the present invention operable to test a plurality of disk drives. As shown in FIG. 1A, each disk drive $4_i$ comprises a head 6 actuated over a disk 8. The disk drive tester 2 comprises a plurality of test slots, where each test slot is operable to receive one of the disk drives $4_i$. The disk drive tester 2 comprises an interface for receiving vibration data from the disk drives $4_i$, wherein the vibration data at least partially represents a vibration applied to each disk drive $4_i$ by the respective test slot. The disk drive tester further comprises control circuitry (e.g., a computer 10) operable to execute the flow diagram of FIG. 1C, wherein vibration data is received from the disk drives (step 12) and a test slot is detected as defective (step 16) in response to the vibration data (step 14).

In the embodiment of FIG. 1A, the disk 8 comprises a plurality of servo sectors $18_0$-$18_N$ recorded around the circumference of the disk 8. Each servo sector 18 comprises position information, such as a track address and servo bursts that define a plurality of concentric servo tracks 20. Control circuitry 22 within the disk drive 4, processes a read signal 24 emanating from the head 6 to demodulate the servo sectors $18_0$-$18_N$ into a position error signal (PES) representing a position error of the head 6 relative to a target servo track. The control circuitry 22 filters the PES using a suitable compensation filter to generate a control signal 26 applied to a voice coil motor (VCM) 28 that rotates an actuator arm 30 about a pivot in order to actuate the head 6 over the disk 8 in a direction that reduces the PES. In an embodiment described below, the control circuitry 22 may generate the vibration data based on the PES while attempting to track one of the servo tracks (e.g., generating the vibration data by extracting a non-repeatable runout (NRRO) from the PES).

Figure 1C:
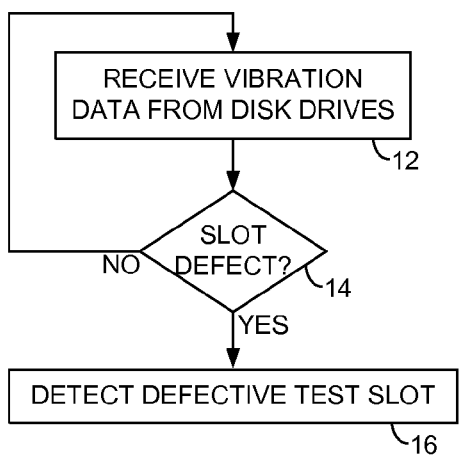
FIG. 1C is a flow diagram according to an embodiment of the present invention wherein a defective test slot is detected in response to vibration data generated by the disk drives.
Figure 2:
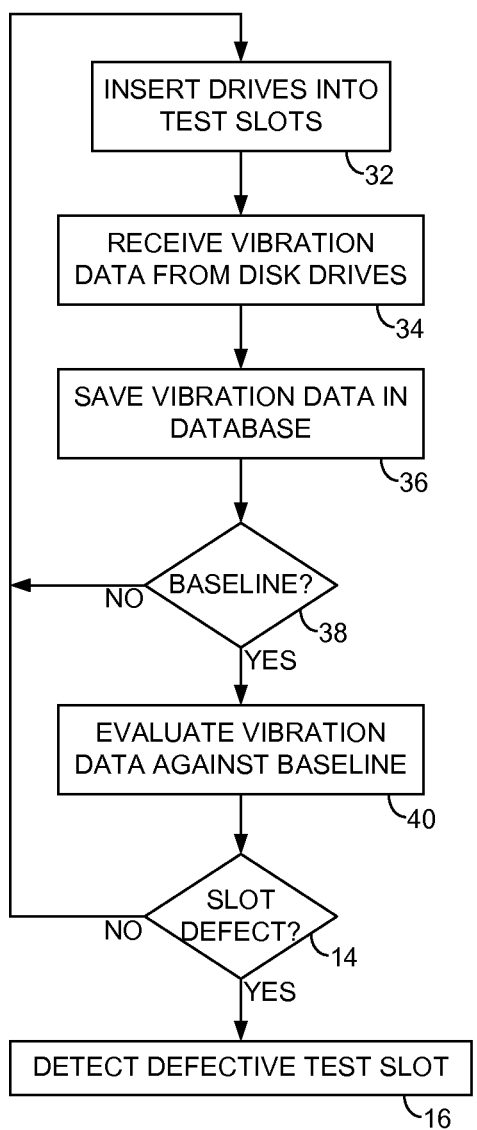
FIG. 2 is a flow diagram according to an embodiment of the present invention wherein a defective test slot is detected relative to a baseline generated while testing a plurality of disk drives under a nominal test condition.

FIG. 2 is a flow diagram according to an embodiment of the present invention that expands on the flow diagram of FIG. 1C. As the disk drives are inserted into the test slots (step 32) and the vibration data is received from the disk drives (step 34), the vibration data is saved in a database (step 36). This processes is repeated (step 38) until a sufficient number of disk drives have been processed to establish a baseline that represents a nominal test condition. The vibration data received thereafter is compared to the baseline in order to detect a defective test slot (step 40).

Figure 3A:
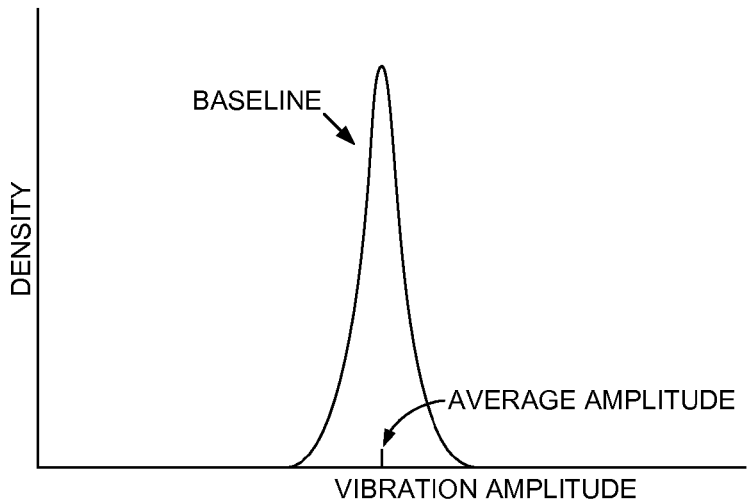
FIG. 3A shows a distribution of a vibration amplitude received from a plurality of disk drives inserted into a plurality of the test slots.

Any suitable baseline may be generated based on the vibration data received from a plurality of disk drives tested by a plurality of the test slots. FIG. 3A shows a distribution for a vibration amplitude received from a plurality of the disk drives tested by a plurality of the test slots. In one embodiment, a distribution for the vibration amplitude may be generated for each test slot, wherein each sample point in the distribution represents the vibration amplitude for one of the disk drives tested. The distribution for a plurality of the test slots may then be averaged to generate a nominal distribution presenting a nominal test slot as illustrated in FIG. 3A.

Figure 3B:
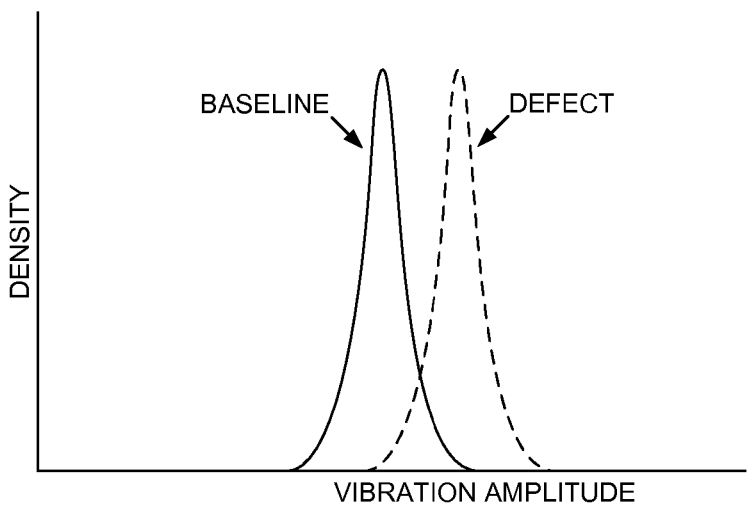
FIG. 3B illustrates a distribution of a vibration amplitude received from a defective test slot.
Figure 3C:
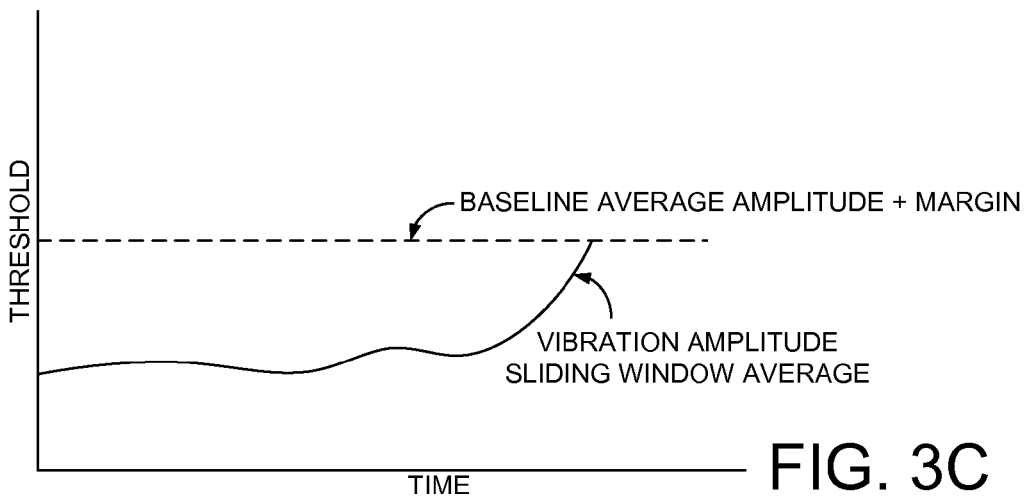
FIG. 3C illustrates an embodiment of the present invention wherein a defective test slot is detected when a sliding window average of the vibration amplitude exceeds a threshold configured from the baseline.

FIG. 3B illustrates an embodiment of the present invention wherein a defective test slot will generate an abnormal distribution for the vibration amplitudes received from the tested disk drives. The distribution is abnormal relative to the baseline distribution. Any statistical data point may be evaluated to detect a defective test slot, wherein in an embodiment illustrated in FIG. 3C, a defective test slot may be detected when the average vibration amplitude exceeds the baseline average amplitude (FIG. 3A) plus a margin. In one embodiment, a sliding window average of the vibration amplitude is compared to the threshold in order to filter outliers while quickly detecting a test slot that may be degrading over time as illustrated in FIG. 3C.

Figure 4:
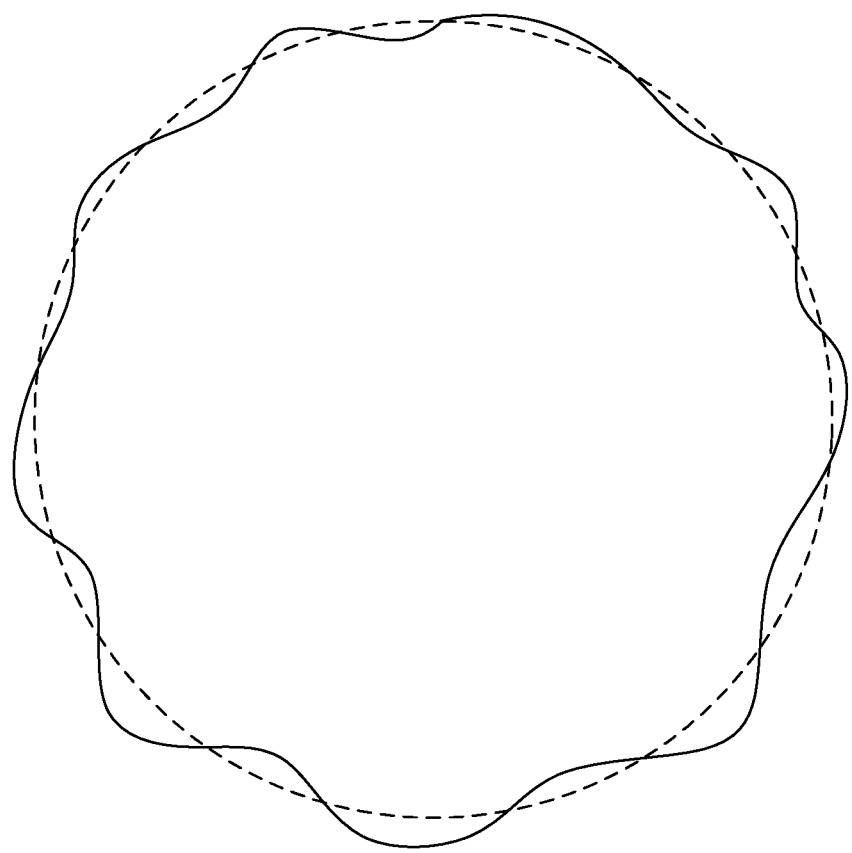
FIG. 4 shows an embodiment of the present invention wherein the vibration data comprises a non-repeatable runout (NRRO) measured by each disk drive while tracking a substantially circular track on the disk.

The disk drive tester 2 of FIG. 1B may receive any suitable vibration data from each disk drive. FIG. 4 shows an embodiment of the present invention wherein the vibration data comprises a non-repeatable runout (NRRO) of the head while tracking a substantially circular track on the disk (e.g., a servo track 20 of FIG. 1A). In one embodiment, the NRRO is extracted from the PES generated by the disk drive servo system. In one embodiment, the NRRO represents the degree of randomness in the PES, which may be measured in any suitable manner, such as using any signal processing algorithm (e.g., Fourier transform). In one embodiment, the NRRO may be measured by compensating for a repeatable runout (RRO) using feed-forward compensation, wherein the residual PES after feed-forward compensation represents the NRRO. In one embodiment, the disk drive may return the average NRRO for the entire servo track to the disk drive tester, and in another embodiment, the disk drive may return the NRRO for each servo sector in the servo track (e.g., residual PES at each servo sector).

Figure 5:
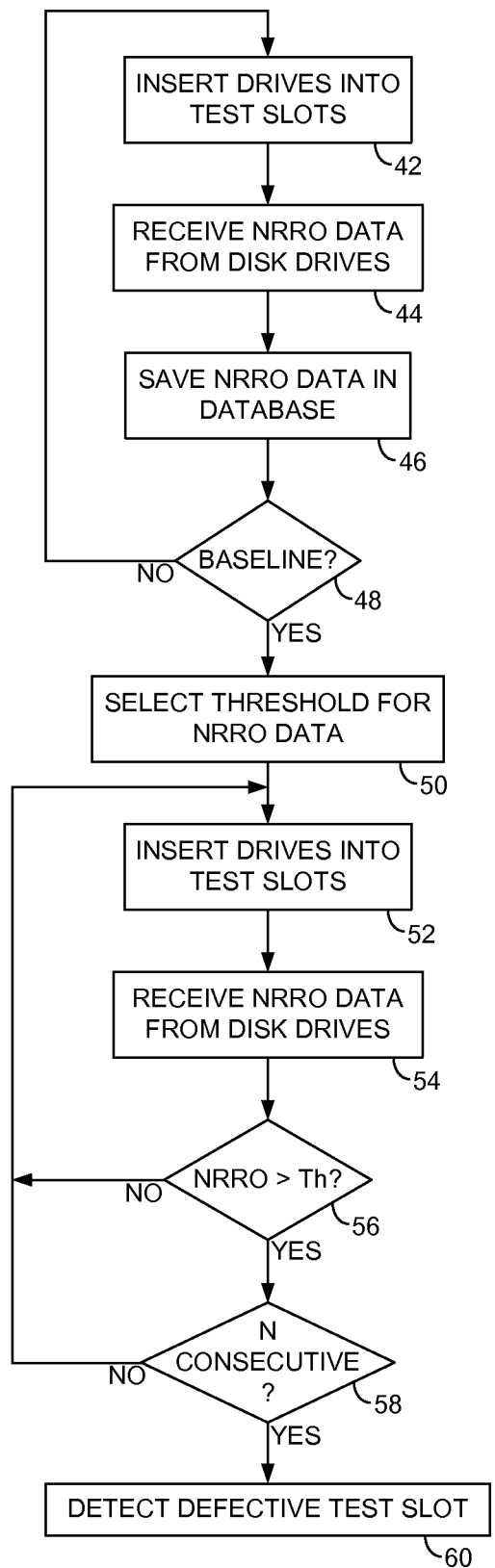
FIG. 5 is a flow diagram according to an embodiment of the present invention wherein a defective test slot is detected when N consecutive disk drives generate a NRRO exceeding a baseline threshold.

FIG. 5 shows a flow diagram according to an embodiment of the present invention wherein disk drives are inserted into the test slots (step 42) and the NRRO is received from the disk drives (step 44) which is saved in a database (step 46). This process is repeated (step 48) until enough disk drives have been processed to generate a baseline. A threshold is then selected for the NRRO data based on the baseline (step 50). Thereafter when disk drives are inserted into the test slots (step 52) and the NRRO received from each disk drive (step 54), the NRRO is compared to the threshold (step 56). When the NRRO for N consecutive disk drives tested by one of the test slots exceeds the threshold (step 58), the test slot is detected as defective (step 60). Requiring N consecutive disk drives to generate a NRRO that exceeds the threshold before detecting a defective test slot is a form of filtering the NRRO to ensure the test slot is truly defective.

Other forms of vibration data that may be employed instead of, or in addition to, the NRRO data may include vibration data generated from a suitable vibration sensor, such as a suitable piezoelectric shock sensor or accelerometer. In another embodiment, the vibration data may include fly height data for the head, wherein a vertical vibration applied to the disk drive may be reflected in the fly height data. The fly height data may be generated in any suitable manner, such as by monitoring the read signal amplitude (or read signal amplifier) which may fluctuate as the fly height changes. In another embodiment, the head may include a suitable fly height sensor, such as a tunneling sensor, capable of generating a direct measurement of the fly height.

In one embodiment, when a test slot is detected as defective, the disk drive tester may disable the test slot to prevent it from being used to test subsequent disk drives. In this manner, the disk drive tester can continue testing disk drives using the good test slots rather than take the disk drive tester off-line for repairs. When the number of failing test slots exceeds a threshold, the disk drive tester may be taken off-line for repairs so that the throughput can be increased.

The disk drive tester 2 of FIG. 1B may comprise any suitable circuitry for implementing the flow diagrams disclosed herein. In one embodiment, the control circuitry comprises a microprocessor operable to execute code segments of a computer program stored on any suitable computer readable storage medium (e.g., a disk or semiconductor memory). In the embodiment of FIG. 1B, the disk drive tester 2 comprises a computer 10 including a monitor and keyboard to facilitate a user interfacing with the disk drive tester through a graphical user interface (GUI). The computer 10 in FIG. 1B may be connected directly to the disk drive tester 2 using a suitable cable (e.g., a Universal Serial Bus (USB) cable), or the computer 10 may be connected to the disk drive tester 2 over a local area or wide area network (i.e., the computer 10 may be at a remote location and access the disk drive tester 2 over a network). In another embodiment, the disk drive tester may comprise an integrated computer and a user interface in the form of a control panel. In yet another embodiment, the disk drive tester may communicate with a computer (e.g., a server) over a network. For example, a server may be used to monitor a number of the disk drive testers and notify an end user when a disk drive tester requires servicing. In one embodiment, an end user may insert the disk drives into and remove the disk drives from the test slots of the disk drive tester, and in another embodiment each disk drive may be inserted into and removed from the test slots using a suitable robotic system.

What is claimed is:

1. A disk drive tester operable to test a plurality of disk drives, each disk drive comprising a head actuated over a disk, the disk drive tester comprising:
    a plurality of test slots, where each test slot is operable to receive one of the disk drives;
    an interface for receiving vibration data from the disk drives, wherein the vibration data at least partially represents a vibration applied to each disk drive by the respective test slot; and
    control circuitry operable to:
        execute at least one test on each disk drive; and
        detect when one of the test slots is defective in response to the vibration data.

2. The disk drive tester as recited in claim 1, wherein the control circuitry is further operable to:
    generate a baseline for the vibration data by testing a plurality of the disk drives, wherein the baseline represents a nominal test condition; and
    detect when one of the test slots is defective in response to the baseline and vibration data received after generating the baseline.

3. The disk drive tester as recited in claim 2, wherein the control circuitry is operable to detect when one of the test slots is defective when the corresponding vibration data received from a plurality of the disk drives deviates from the baseline by a threshold.

4. The disk drive tester as recited in claim 1, wherein the control circuitry is operable to detect when one of the test slots is defective when a running average of the corresponding vibration data received from a plurality of the disk drives exceeds a threshold.

5. The disk drive tester as recited in claim 4, wherein the control circuitry is operable to:
    generate a baseline for the vibration data by testing a plurality of the disk drives, wherein the baseline represents a nominal test condition; and
    configure the threshold in response to the baseline.

6. The disk drive tester as recited in claim 1, wherein the vibration data comprises a non-repeatable runout (NRRO) of the head while tracking a substantially circular track on the disk.

7. The disk drive tester as recited in claim 6, wherein the control circuitry is operable to detect when one of the test slots is defective when the NRRO of a plurality of consecutive disk drives tested by the test slot exceeds a threshold.

8. The disk drive tester as recited in claim 7, wherein the control circuitry is operable to:
    generate a baseline for the vibration data by testing a plurality of the disk drives, wherein the baseline represents a nominal test condition; and
    configure the threshold in response to the baseline.

9. A method of operating a disk drive tester for testing a disk drive, the disk drive comprising a head actuated over a disk, the method comprising:
    inserting a disk drive into a test slot;
    executing at least one test on the disk drive;
    receiving vibration data from the disk drive, wherein the vibration data at least partially represents a vibration applied to the disk drive by the test slot; and
    detecting the test slot is defective in response to the vibration data.

10. The method as recited in claim 9, further comprising:
   generating a baseline for the vibration data by testing a plurality of disk drives, wherein the baseline represents a nominal test condition; and
   detecting when the test slot is defective in response to the baseline and vibration data received after generating the baseline.

11. The method as recited in claim 10, further comprising detecting when the test slots is defective when the vibration data deviates from the baseline by a threshold.

12. The method as recited in claim 9, further comprising detecting when the test slot is defective when a running average of the vibration data exceeds a threshold.

13. The method as recited in claim 12, further comprising:
   generating a baseline for the vibration data by testing a plurality of the disk drives, wherein the baseline represents a nominal test condition; and
   configuring the threshold in response to the baseline.

14. The method as recited in claim 9, wherein the vibration data comprises a non-repeatable runout (NRRO) of the head while tracking a substantially circular track on the disk.

15. The method as recited in claim 14, further comprising detecting when one of the test slots is defective when the NRRO of a plurality of consecutive disk drives tested by the test slot exceeds a threshold.

16. The method as recited in claim 15, further comprising:
   generating a baseline for the vibration data by testing a plurality of disk drives, wherein the baseline represents a nominal test condition; and
   configuring the threshold in response to the baseline.

* * * * *